US006673890B1

(12) United States Patent
Boeckh et al.

(10) Patent No.: US 6,673,890 B1
(45) Date of Patent: Jan. 6, 2004

(54) ZWITTERIONIC POLYAMINES AND PROCESS FOR THEIR PRODUCTION

(75) Inventors: Dieter Boeckh, Limburgerhof (DE); Oliver Borzyk, Speyer (DE); Michael Ehle, Ludwigshafen (DE); Ralf Nöerenberg, Buettelborn (DE); Eugene P. Gosselink, Cincinnati, OH (US); Jeffrey S. DuPont, Cincinnati, OH (US); Robert H. Rohrbaugh, Cincinnati, OH (US); Kenneth N. Price, Cincinnati, OH (US); Randall S. Deinhammer, Cincinnati, OH (US)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 10/030,989

(22) PCT Filed: Jul. 5, 2000

(86) PCT No.: PCT/EP00/06296
§ 371 (c)(1),
(2), (4) Date: Jan. 16, 2002

(87) PCT Pub. No.: WO01/05874
PCT Pub. Date: Jan. 25, 2001

(30) Foreign Application Priority Data

Jul. 16, 1999 (US) .............................. 60144165

(51) Int. Cl.$^7$ .................... C08G 73/02; C11D 3/37
(52) U.S. Cl. .................... 528/229; 528/76; 528/82; 528/391; 528/422; 528/423; 525/540; 564/281; 564/290; 564/295; 558/47; 558/158; 510/321; 510/337; 510/393; 510/475; 510/499
(58) Field of Search .................... 528/82, 391, 229, 528/422, 423; 525/540; 510/499, 475, 393, 321, 337; 558/47, 158; 564/281, 290, 295

(56) References Cited

U.S. PATENT DOCUMENTS

| 4,739,094 | A | | 4/1988 | Mazanek et al. | |
|---|---|---|---|---|---|
| 5,049,680 | A | | 9/1991 | O'Lenick, Jr. | |
| 6,156,720 | A | * | 12/2000 | Boeckh et al. | ............... 510/475 |
| 6,300,304 | B1 | * | 10/2001 | Boeckh et al. | ............... 510/475 |
| 6,407,053 | B1 | * | 6/2002 | Randall et al. | ............. 510/499 |
| 6,452,035 | B2 | * | 9/2002 | Dupont et al. | ................. 558/20 |
| 6,482,787 | B1 | * | 11/2002 | Panandiker et al. | ......... 510/336 |
| 6,525,012 | B2 | * | 2/2003 | Price et al. | .................. 510/321 |
| 6,531,438 | B1 | * | 3/2003 | Littig et al. | .................. 510/322 |
| 6,579,846 | B1 | * | 6/2003 | Zirnstein et al. | ............ 510/499 |
| 2002/0002127 | A1 | * | 1/2002 | Price | .......................... 510/314 |
| 2002/0004474 | A1 | * | 1/2002 | Price | .......................... 510/375 |

FOREIGN PATENT DOCUMENTS

| DE | 196 47 060 | 5/1998 |
|---|---|---|
| EP | 0 111 976 | 12/1983 |
| EP | 0 112 592 | 12/1983 |
| GB | 2 220 215 | 1/1990 |
| WO | 97 28207 | 8/1997 |

* cited by examiner

Primary Examiner—P. Hampton-Hightower
(74) Attorney, Agent, or Firm—Oblon, Spivak, McClelland, Maier & Neustadt, P.C.

(57) ABSTRACT

A zwitterionic polyamine comprising a linear or branched hydrophobic polyamine backbone having 2 to 10 tertiary amino nitrogen atoms and a spacer between two tertiary nitrogen atoms wherein the spacer is, for example selected from $C_8$–$C_{16}$-alkylene, $C_5$–$C_{15}$-cyloalkylene, wherein in formula (IV) R=$C_1$- to $C_{22}$-alkyl or $C_7$–$C_{22}$-aralkyl and n=3 to 6, at least one tertiary amine end group of the polyamine backbone contains two groups having formula (V) or (VI), wherein A means an ethylene oxide unit, a propylene oxide unit, a unit of butylene oxides and a tetrahydrofuran unit, n is a number of from 1 to 50, X is an anionic group such as —$SO_3M$, with the proviso that in formula (VI) one X may also be hydrogen and M is hydrogen, alkai metal or ammonium, or contains one group of formula (V) or (VI) and one group selected from radicals consisting of formula (VII), $C_1$- to $C_{22}$-alkyl and $C_7$–$C_{22}$-aralkyl the meaning of A and n is the same as in formula (V) or (VI), said zwitterionic polyetherpolyamine having a molecular weight up to 9000 and optionally containing up to 100% of the nitrogen atoms quaternize, and a process for the production of zwitterionic polyamines by alkoxylating said polyamines, introducing anionic groups into the alkoxylated polyamines and optionally quaternizing them before or after the introduction of anionic groups. The zwitterionic polyamines are used in detergents.

18 Claims, No Drawings

ZWITTERIONIC POLYAMINES AND PROCESS FOR THEIR PRODUCTION

This application is a 371 of PCT EP00/06296 filed Jul. 5, 2000.

The present invention relates to zwitterionic polyamines and a process for their production by alkoxylation of polyamines and introduction of anionic groups.

BACKGROUND OF THE INVENTION

EP-A-0,111,976 relates to watersoluble zwitterionic compounds having clay soil removal/anti-redeposition properties. An example of such a compound is a with chlorosulfonic acid sulfated quaternized addition product of ethoxylated tetraethylenepentamine with a total degree of ethoxylation of 21.

EP-A-0,112,592 relates to zwitterionic polymers which are for example obtained by alkoxylation of polyalkyleneamines such as triethylenetetramine or tetraethylenepentamine or of polyethyleneimines, sulfonation of the alkoxylated products and subsequent quaternization. The zwitterionic products disclosed in the above patents have clay-soil removal and anti-redeposition properties when used in detergent compositions, however their effectiveness in dispersing and removing clay embedded in the fabric into the laundry liquor is not sufficient. Furthermore the specifically disclosed compounds of this literature reference are thermally instable.

GB-A-2,220,215 relates to sulfated alkoxylated mono- or polyamines derived from polymethlenediamines with 2–6 methylene groups between the nitrogen atoms or polyalkylenepolyamines in which the alkylene contains 2–4 carbon atoms and containing 3–6 amino groups. They may bear a long chain-alkyl substituent at one of the nitrogen atoms and are quaternized. However it was found that these polymers are not favorable for clay soil removal within laundry operations where anionic surfactants are present.

U.S. Pat. No. 4,739,094 discloses alkoxylated aminopolyethers containing units of ethylene oxide and propylene oxide and having a molecular weight of from 10,000 to 150,000. The alkoxylated aminopolyethers are water-soluble and are used in 5 to 60% strength by weight aqueous solution in the preparation of coal/water slurries. If appropriate, the alkoxylated aminopolyethers can also be reacted with carboxylic acid anhydrides, amidosulfonic acids and urea, acid chlorides of sulfur or of phosphorus or chloroacetic acid esters. The reaction products can be converted into ionic compounds by subsequent neutralization or hydrolysis.

It is therefore an object of the invention to provide new polymers with improved thermal stability.

SUMMARY OF THE INVENTION

The above object is achieved with a zwitterionic polyamine comprising a linear or branched hydrophobic polyamine backbone having 2 to 10 tertiary amino nitrogen atoms and a spacer between two tertiary amino nitrogen atoms wherein the spacer is selected from the group consisting of $C_3$–$C_{15}$-alkylene, $C_5$–$C_{15}$-cycloalkylene

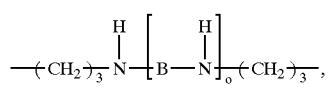
(I)

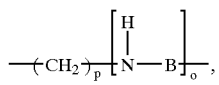
(II)

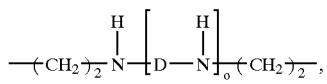
(III)

wherein in formula I, II and III
B is $C_2$–$C_{16}$-alkylene, $C_5$–$C_{15}$-cycloalkylene
D is $C_4$–$C_{16}$-alkylene, $C_5$–$C_{15}$-cycloalkylene
O is 1 or 2,
p is 3 to 8

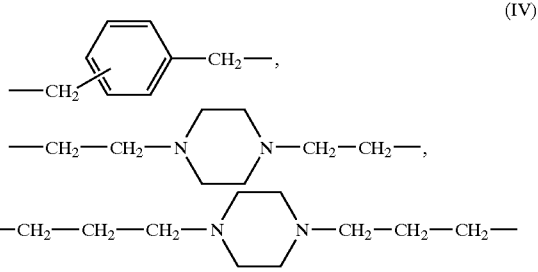
(IV)

and

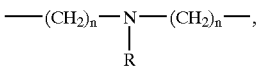

wherein in formula IV
R=$C_1$- to $C_{22}$-alkyl or $C_7$–$C_{22}$-aralkyl and n=3 to 6,
at least one tertiary amine end group of the polyamine backbone contains two groups having the formula

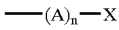
(V)

or

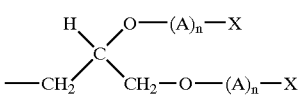
(VI)

wherein
A means an ethylene oxide unit, a propylene oxide unit, a unit of butylene oxides and a tetrahydrofuran unit,
n is a number of from 1 to 50,
X is —$SO_3M$, —$CH_2$—$CH_2$—$SO_3M$, —$CH_2$—$CH_2$—$CH_2$—$SO_3M$,

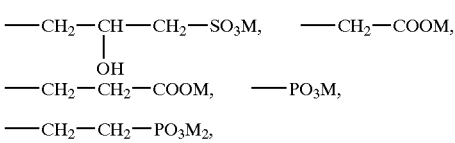

with the proviso that in formula VI one X may also be hydrogen and
M is hydrogen, alkali metal or ammonium,
or contains one group of formula V or VI and one group selected from radicals consisting of

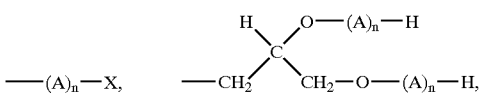

$C_1$- to $C_{22}$-alkyl and $C_7$–$C_{22}$-aralkyl, the meaning of A and n is the same as in formula V or VI, said zwitterionic polyamine having a molecular weight up to 9,000 optionally containing up to 100% of the nitrogen atoms quaternized.

The object is also achieved with a process for the production of a zwitterionic polyamine which comprises a first step wherein (i) a linear or branched hydrophobic polyamine having 2 to 10 tertiary amino nitrogen atoms and a spacer between two tertiary amino nitrogen atoms wherein the spacer is selected from the group consisting of $C_8$- to $C_{16}$-alkylene, $C_5$- to $C_{15}$-cycloalkylene

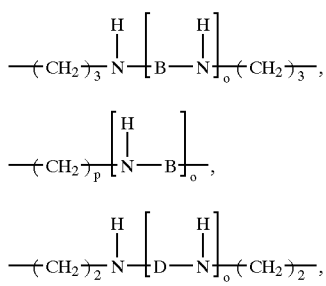

wherein in formula I, II and III

B is $C_2$–$C_{16}$-alkylene, $C_5$–$C_{15}$-cycloalkylene

D is $C_4$–$C_{16}$-alkylene, $C_5$–$C_{15}$-cycloalkylene o is 1 or 2, p is 3 to 8

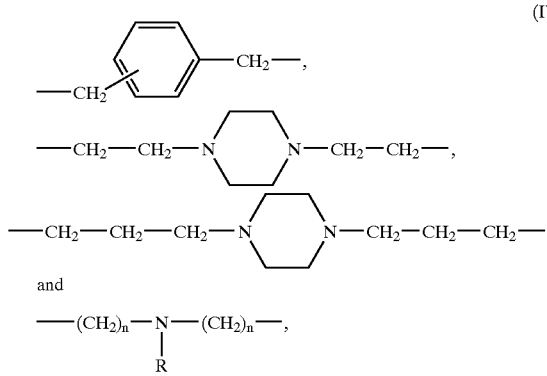

wherein in formula IV

R=$C_1$- to $C_{22}$-alkyl or $C_7$–$C_{22}$-aralkyl and n=2 to 6, is reacted with (ii) at least one $C_2$- to $C_4$-alkylene oxide or tetrahydrofurane at such a ratio that on each NH group of the polyamine 1 to 50 units of the alkylene oxide or of tetrahydrofurane are added, a second step wherein the alkoxylated polyamine obtained in the first step is reacted with a compound selected from the group consisting of a halogen sulfonic acid, halogen phosphorous acid, vinyl sulfonic acid, propane sultone, halogen acetic acid, acrylic acid, methacrylic acid, vinyl phosphorous acid and the alkali metal or ammonium salts of the said acids, in such a manner that at least one tertiary amine end group of the alkoxylated polyamine contains two groups having the formula

wherein

A means an ethylene oxide unit, a propylene oxide unit, a unit of butylene oxides and a tetrahydrofuran unit, n is a number of from 1 to 50, X is —$SO_3M$, —$CH_2$—$CH_2$—$SO_3M$, —$CH_2$—$CH_2$—$CH_2$—$SO_3M$,

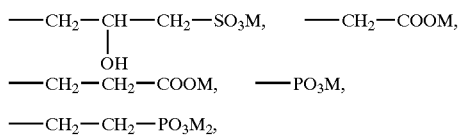

—$CH_2$—$CH_2$—$PO_3M_2$, with the proviso that in formula VI one X may also be hydrogen and M is hydrogen, alkali metal or ammonium, or contains one group of formula V or VI and one group selected from radicals consisting of

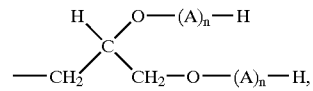

the meaning of A and n is the same as in formula V or VI, and optionally a third step wherein up to 100% of the tertiary nitrogen atoms of the reaction product obtained in the second step are quaternized, said degree of quaternization, may also be obtained by first quaternizing the reaction product obtained in the first step and subsequently carrying out the second step.

Preferred zwitterionic polyamines contain two groups of formula V or VI attached to the tertiary nitrogen atoms of the end groups of the polyamines. Especially preferred zwitterionic polyamines contain the nitrogen atoms of the end groups of the polyamine backbone quaternized and, as substituents, two groups of formula V or VI and one $C_1$- to $C_{22}$-alkyl group or a hydroxyalkyl group. In most cases the nitrogen end groups of the polyamine backbone are quaternized and contain as substituents two groups of formula V and a $C_1$- to $C_{22}$-alkyl group. Other preferred zwitterionic polyamines contain quaternized amino nitrogen end groups bearing, as substituents, two groups of formula V and a hydroxyethyl or hydroxypropyl group.

The substituent A in formulae V and VI may have the following structures:

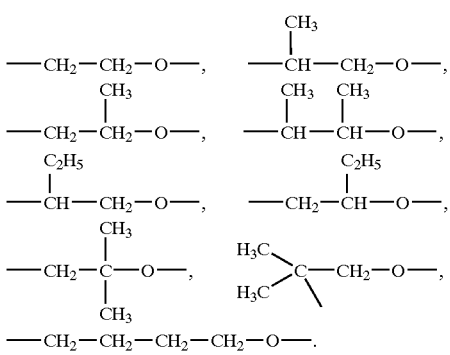

Other zwitterionic polyamines are charaterized in that the spacer between two nitrogen atoms of the polyamine backbone is a cyclic $C_5$- to $C_{15}$-alkylene group.

Of particular interest are zwitterionic polyamines wherein the polyamine backbone between the nitrogen atoms is derived from an amine selected from the group consisting of bis(hexamethylene)triamine, N,N'-bis(3-aminopropyl)piperazine, N,N'-bis(2-aminoethyl)piperazine and bis(3-aminopropyl)hexamethylenediamine and wherein at least one tertiary amine end group of the polyamine backbone contains two groups having formula V or VI.

The zwitterionic polyamine is derived from a linear or branched hydrophobic polyamine. The backbone of the polyamine contains 2 to 10 tertiary amino nitrogen atoms and has one spacer between two tertiary amino nitrogen atoms. Polyamines containing a $C_8$- to $C_{16}$-alkylene group as spacer are for example 1,8-diaminooctane, 1,10-diaminodecane and 1,12-diaminododecane. Examples of suitable polyamines containing the above spacers of formula I–IV are dipropylenetriamine, tripropylenetetramine, bis(hexamethylene)triamine, bis(octamethylene)triamine, aminoethylpropylenediamine, aminoethylbutylenediamine, aminoethylhexamethylenediamine, N,N'-bis(aminoethyl)propylenediamine, N,N'-bis(aminoethyl)butylenediamine, N,N'-bis(aminoethyl)hexamethylenediamine, N,N'-bis(aminopropyl)ethylendiamine, N,N'-bis(aminopropyl)butylenediamine, N,N'-bis(aminopropyl)butylendiamine, N,N'-bis(aminopropyl)hexamethylenediamine, N,N'-bis(aminopropyl)ethylenediamine, N,N'-bis(3-aminopropyl)-N-methylamine, N-(dimethylaminopropyl)propylenediamine, N,N'-dimethyl-1,3-diaminopropane; N,N-bis (3-aminopropyl) -N-octylamine and N,N-bis (3-aminopropyl)-N-ethylamine.

Polyamines with spacers consisting of a cyclic C5- to C15-alkylene group are for example 1,3-cyclohexylenediamine, 4-methyl-1,3-cyclohexylenediamine, 2-methyl-1,3-cyclohexylenediamine, isophoronediamine and 4,4'-diamino(biscyclohexylene)methane.

The zwitterionic polyamines can also be prepared from polyamines which contain other cyclic spacers. Such polyamines are, for example, o-, m-, and p-di(aminomethylen)benzene, N,N'-bis(aminoethyl)piperazine, N,N'-bis(aminopropylpiperazine and N-aminopropylpiperazine.

Especially preferred zwitterionic polyamines may be characterized by the following formula

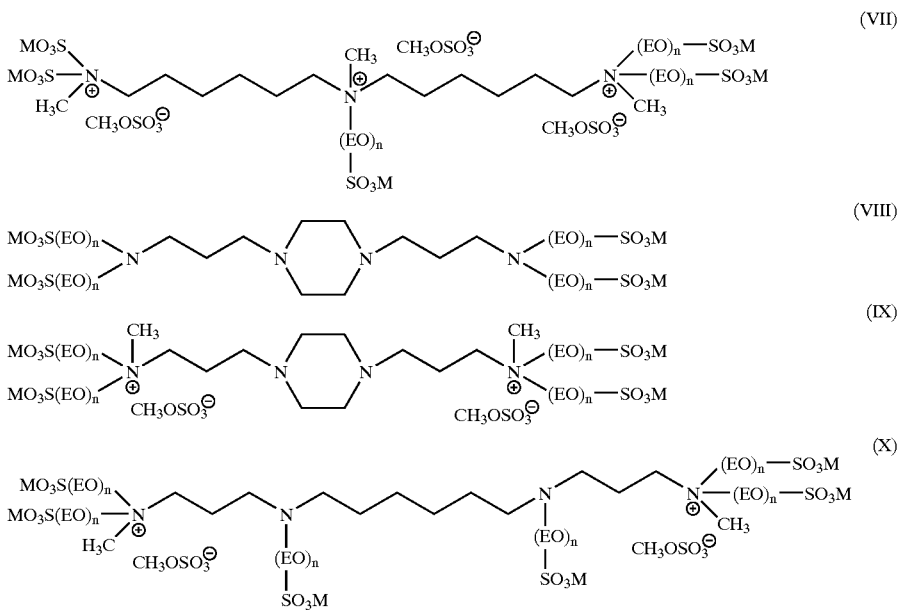

wherein
EO is —$CH_2$—$CH_2$—O—
M is H, Na, K or ammonium and
n is 15–25.

The weight average molecular weight Mw of the zwitterionic polypolyamines is up to 9,000, preferably of from 1,500 to 7,500 and more preferably of from 2000 to 6,000. The zwitterionic polyamines can be soluble or dispersible in water and aqueous or non-aqueous solvents or formulations. In one preferred embodiment of the present invention they are water-soluble. These water soluble zwitterionic polyetherpolyamines are used in laundry detergent compositions and have an excellent degree of clay soil removal from fabrics.

The zwitterionic polyamines are net anionic. Preferably the average number of anionic charges resulting from groups X in formulae V and VI exceeds the average number of cationic charges resulting from protonated or quaternized amine groups by a factor of more than 1.2, more preferred of more than 1.5, most preferred of more than 1.8.

The zwitterionic polyamines of the invention are prepared in a multistage process. In the first step of this process a linear or branched polyamine having 2 to 10 primary or secondary nitrogen atoms and containing one of the above spacers between two nitrogen atoms is reacted with a least one $C_2$- to $C_4$-alkylene oxide or tetrahydrofurane at such a ratio that on each NH group of the polyamine 1 to 50, preferably 15 to 25 alkylene oxide units or tetrahydrofurane units are added. Ethylene oxide and propylene oxide are the preferred alkoxylating agents. If a mixture of alkylene oxides is added to the amino nitrogen then the polymerized alkylene oxides may be present in statistical distribution or as blocks. For example one can add first 10 to 20 of ethylene oxide units per NH group in the polyamine and then add 5 to 10 propylene oxide units or vice versa.

Most preferred ethylene oxide alone or combinations of 1–15% propylene oxide or 1–10% butylene oxide with 85–99, 90–99% ethylene oxide respectively are used. If a combination of ethylene oxide and propylene oxide or butylene oxide is used preferably the propylene oxide or butylene oxide is reacted first with the NH groups of the polyamine and the ethylene oxide is added after that.

The above described procedure gives polyalkoxylated products which have groups of formula

wherein A and n have the meaning given for formula V.

The linear or branched polyamines are preferably ethoxylated in the first step of the production of the zwitterionic polyamines.

In order to produce zwitterionic polyamines having end groups of formula VI a linear or branched polyamine having 2 to 10 nitrogen atoms and containing at least 2 primary or secondary amino nitrogen groups is reacted with up to 1 glycidol per NH group. The reaction product thus obtained is in the first step of the process according to the invention alkoxylated at the OH groups and remaining NH groups as described above. The reaction of glycidol with said polyamine may be carried out to such an extent that at least 50 to 100% of the NH groups of the polyamine are substituted by one glycidol unit.

In the second step of the production of the zwitterionic polyamines an anionic group is introduced into the alkoxylated polyamines obtained in the first step. This may be achieved by reacting the alkoxylated polyamines in a Michael type addition reaction with acrylic acid, methacrylic acid, vinyl sulfonic acid, vinylphosphonic acid or their alkalimetal or ammonium salts or by reacting them with halogen sulfonic acid, halogen phosphorous acid, propane sultone or halogen acetic acid. The preferred component for introducing anionic groups is chlorosulfonic acid.

Dependent on the amount of anionic agent used in the second step zwitterionic products are obtained which contain either two substituents of formula V or VI or contain only one of them, if, for instance, only one mole of the anionic agent is used per one mole of OH end group of the alkoxylated polyamine. The non-reacted end groups of the alkoxylated polyamine may be characterized by a group selected from radicals consisting of

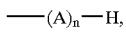

and

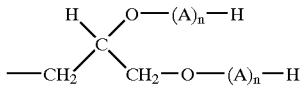

the meaning of A and n is the same as in formula V or VI.

The degree of substitution of the OH groups in the alkoxylated polyamines is such, that the finally resulting zwitterionic polyamine is net anionic at the pH of intended use; e.g. from 40% up to 100% of the OH group a substituted by an anionic group. Preferably more than 60%, more preferred more then 80%, most preferred 90–100% of the OH-groups are substituted by an anionic group.

Moreover the zwitterionic polyamines may also contain only one substituent of formula V or VI and instead of the above described radicals a $C_1$–$C_{22}$-alkyl group or a $C_7$- to $C_{22}$-aralkyl group. Such compounds result when the polyamine used in the first step contains secondary amino groups having a $C_1$- to $C_{22}$-alkyl or a $C_7$- to $C_{22}$-aralkyl substituent.

The zwitterionic polyamines obtained in the second step may optionally reacted in a third step with a quaternizing agent. Alternatively, quaternized products may also be obtained by first quaternizing the reaction products obtained in the first step, i.e. the polyalkoxylated polyamines. Suitable quaternization agents are for example $C_1$- to $C_{22}$-alkylhalides, $C_7$- to $C_{22}$-aralkyl halides $C_1$–$C_2$-dialkylsulfates or alkylene oxides. Examples of quaternizing agents are dimethyl sulfate, diethyl sulfate, methyl chloride, ethyl chloride, methyl bromide, ethyl bromide, butyl bromide, hexyl chloride, benzyl chloride, benzyl bromide, ethylene oxide or propylene oxide. Dialkylsulfates, $C_1$–$C_4$-alkylchlorides and benzyl chloride are preferred. Dimethyl sulfate is the most preferred quaternizing agent. Up to 100% of the tertiary nitrogen atoms of the zwitterionic polyamine may be quaternized. If there is a quaternization step, then the degree of quaternization is, for example, 10 to 100%, preferably at least 25% and more preferably 75 to 100%.

According to a preferred embodiment of the process for the production of zwitterionic polyamines in the first step (i) a polyamine selected from the group consisting of bis(hexamethylene)triamine, bis(aminopropyl) piperazine, N,N'-bis(aminopropyl) hexamethylenediamine and N,N,N',N'',N''-penta(2,3-dihydroxypropyl)-bis(hexamethylene)triamine—the latter is obtained by reacting bis(hexamethylene) triamine with glycidol in a molar ratio of 1:5)—is reacted with (ii) an alkylene oxide selected from the group consisting of ethylene oxide, propylene oxide, butylene oxide and mixtures of the said alkylene oxides, at such a ratio that on each NH group of the polyamine 15 to 40 units of the alkylene oxide are added, in the second step the alkoxylated polyamine obtained in the first step is reacted with chlorosulfonic acid in such ratio that at least one teritary end group of the polyamine contains two groups having the formula

 (V), wherein

A is an ethylene oxide unit, a propylene oxide unit or a butylene oxide unit, n is 15–40 and X is SO$_3$H, and in the third step the zwitterionic reaction product of the second step is quaternized with dimethyl sulfate, methyl chloride or benzyl chloride.

The quaternization can also be carried out as a second step in the multistage process for the production of zwitterionic polyamines. The alkoxylated polyamine obtained in the first step is quaternized up to 100% and subsequently reacted with chlorosulfonic acid or another agent capable to introduce an anionic group. This procedure is preferred for the production of quaternized zwitterionic polyamines.

The zwitterionic polyamines are used as additive in laundry detergent compositions which provide enhanced hydrophilic soil, inter alia, clay, removal benefits. The new zwitterionic polyamines are especially useful in detergents comprising a surfactant system which comprises mid-chain branched surfactants inter alia mid-chain branched alkyl sulphonates. The zwitterionic polyamines are additionally used as effective dispersants for hydrophilic particles within aqueous and nonaqueous solutions and formulations.

The degree of quaternization and of sulfatation was determined by $^1$H-NMR. The amine number was determined by amine titration according to DIN 16 945.

EXAMPLE 1

(a) Ethoxylation of bis(Hexamethylene)triamine ("BHMT")

A pressurizable 5 l autoclave fitted with a stirrer and a heating device was the sealed and three times pressurized with nitrogen at 10 bar. 150.5 g (0.7 mole) of BHMT and 15 g of water were placed in the autoclave which was heated to 80° C. The autoclave was then sealed presure-tight and three times pressurized with nitrogen at 5 bar and thereafter the pressure released. The contents of the autoclave were heated while stirring to 110° C. At this temperature 157.1 g (3.57 moles) of ethylene oxide were added continuously while maintaining the temperature between 110–120° C. and the maximum pressure up to 5 bar. The reaction mixture was stirred until the pressure was constant and then cooled to about 80° C. The pressure was then released, the autoclave three times pressurized with nitrogen at 5 bar and 9.2 g of a 50% strenght by weight sodium hydroxide solution were added.

The autoclave was then sealed and vacuum continuously applied to remove the water. The contents of the reactor were heated for four hours at 120° C. and at a pressure of 10 mbar. vacuum was removed with nitrogen and the autoclave heated to 140° C. Between 140 and 150° C. 2,926 g (66.5 moles) of ethylene oxide were continuously introduced into the autoclave while stirring. The maximum pressure was 10 bar. The reaction mixture was stirred until the pressure was constant. The contents of the reactor were then cooled to 80° C. and the reactor three times pressurized with nitrogen at 5 bar. 3,238 g of a reaction product was obtained which was an ethoxylated BHMT containig 20 ethylene oxide units per NH group of bis(hexamethylene)triamine ("BHMT EO20").

(b) Quaternization of Ethoxylated bis (Hexamethylene)triamine with 20 moles of Ethylene Oxide per NH Group in BHMT Into a weighed, 2000 ml, 3 neck round bottom flask fitted with argon inlet, condenser, addition funnel, thermometer, mechanical stirring and argon outlet (connected to a bubbler) is added 455.0 g of BHMT EO20 (0.295 mol N, 98% active, M$_W$ 4,626 g/mole) and methylene chloride (1000 g) under argon. The mixture is stirred at room temperature until the polymer has dissolved. The mixture is then cooled to 5° C. using an ice bath. Dimethyl sulfate (39.5 g, 0.31 mol, 99% , m.w.–126.13) is slowly added using an addition funnel over a period of 15 minutes. The ice bath is removed and the reaction is allowed to rise to room temperature. After 48 hrs. the reaction is complete. The obtained product was analyzed by titration of the amine-number and by $^1$H-NMR integration to have more then 90% of the nitrogen atoms quaternized.

(c) Sulfation of Quaternized Ethoxylated bis (Hexamethylene)triamine

Under argon, the reaction mixture from the quaternization step (b) is cooled to 5° C. using an ice bath (0.59 mol OH). Chlorosulfonic acid (72 g, 0.61 mol, 99% , mw–116.52) is slowly added using an addition funnel. The temperature of the reaction mixture is not allowed to rise above 10° C. The ice bath is removed and the reaction is allowed to rise to room temperature. After 6 hrs. the reaction is complete. The reaction is again cooled to 5° C. and sodium methoxide (264 g, 1.22 mol, Aldrich, 25% in methanol, m.w.–54.02) is slowly added to the rapidly stirred mixture. The temperature of the reaction mixture is not allowed to rise above 10° C.; The reaction mixture is transferred to a single neck round bottom flask. Purified water (1300 ml) is added to the reaction mixture and the methylene chloride, methanol and some water is stripped off on a rotary evaporator at 50° C. The clear, light yellow solution is transferred to a bottle for storage. The final product pH is checked and adjusted to ~9 using 1N NaOH or 1N HCl as needed. The obtained product was analyzed by $^1$H-NMR integration to have more then 90% of the OH-end groups of the polyethylene oxide chains sulfated.

EXAMPLES 2–5

According to the procedure given in Example 1(a) the following amines

Amine 1: bis(hexamethylene)triamine

Amine 2: bis(aminopropyl)piperazine

Amine 3: N,N'-bis(aminopropyl)hexamethylenediamine

Amine 4: N,N,N',N'',N''-penta(2,3-dihydroxypropyl)-bis (hexamethylene)triamine which is the reaction product of 1 mole of bis(hexamethylene)triamine with 5 moles of glycidol were reacted with ethylene oxide in the amounts given in Table 1. The ethoxylated amines were then—with the exception of Example 5—quaternized following the procedure given in Example 1(b) and subsequently sulfated according to the procedure of Example 1 (c). The amounts of dimethylsulfate and chlorsulfonic acid were adjusted appropriately. The degree of quaternization and sulfation is given in Table 1.

TABLE 1

| Example | Amine No. | Moles of EO* added per mole of NH groups in amine | Amine number of EO addition product | % quaternization | % sulfation |
|---|---|---|---|---|---|
| 2 | 1 | 20 | 40.6 | 90 | 50 |
| 3 | 2 | 20 | 62.3 | 90 | 90 |

TABLE 1-continued

| Example | Amine No. | Moles of EO* added per mole of NH groups in amine | Amine number of EO addition product | % quaternization | % sulfation |
|---|---|---|---|---|---|
| 4 | 3 | 20 | 29.9 | 90 | 90 |
| 5 | 4 | 10 | 29.2 | 0 | 90 |

*EO: ethylene oxide

What is claimed is:

1. A zwitterionic polyamine, comprising:

a linear or branched hydrophobic polyamine backbone having 2 to 10 tertiary amino nitrogen atoms and a spacer between two tertiary nitrogen atoms, wherein the spacer is selected from the group consisting of $C_8$–$C_{16}$-alkylene, $C_5$–$C_{15}$-cyloalkylene, $$-(CH_2)_3-\underset{H}{N}-[B-\underset{H}{N}]_o-(CH_2)_3-, \quad (I)$$

$$-(CH_2)_p-\underset{H}{N}-[\underset{H}{N}-B]_o-, \quad (II)$$

$$-(CH_2)_2-\underset{H}{N}-[D-\underset{H}{N}]_o-(CH_2)_2-, \quad (III)$$

(IV) structures: benzyl-CH$_2$—, piperazine with —CH$_2$—CH$_2$—N and N—CH$_2$—CH$_2$—, extended piperazine with —CH$_2$—CH$_2$—CH$_2$—N and N—CH$_2$—CH$_2$—CH$_2$—, and $$-(CH_2)_n-\underset{R}{N}-(CH_2)_n-,$$

wherein in formulae I, II and III

B is $C_2$–$C_{16}$-alkylene or $C_5$–$C_{15}$-cycloalkylene,

D is $C_4$–$C_{16}$-alkylene or $C_5$–$C_{15}$-cycloalkylene, o is 1 or 2, p is 3 to 8, wherein in formula IV R is $C_1$- to $C_{22}$-alkyl or $C_7$–$C_{22}$-aralkyl, and n is an integer of from 3 to 6, wherein at least one tertiary amine end group of the polyamine backbone contains two groups having the following formulae $$-(A)_n-X \quad (V)$$

or $$\begin{array}{c} H \quad O-(A)_n-X \\ \diagdown C \diagup \\ -CH_2 \quad CH_2-O-(A)_n-X, \end{array} \quad (VI)$$

wherein in formulae V and VI

A is an ethylene oxide unit, a propylene oxide unit, a unit of butylene oxides or a tetrahydrofuran unit, n is a number of from 1 to 50, X is —SO$_3$M, —CH$_2$—CH$_2$—SO$_3$M, —CH$_2$—CH$_2$—CH$_2$—SO$_3$M,

—CH$_2$—CH(OH)—CH$_2$—SO$_3$M, —CH$_2$—COOM,

—CH$_2$—CH$_2$—COOM, —PO$_3$M$_2$ or

—CH$_2$—CH$_2$—PO$_3$M$_2$, with the proviso that in formula VI one X may also be hydrogen, and M is hydrogen, alkali metal or ammonium, or wherein at least one tertiary amine end group of the polyamine backbone contains a) one group of formulae V or VI and b) one group selected from the group consisting of $$-(A)_n-X,$$

$$\begin{array}{c} H \quad O-(A)_n-H \\ \diagdown C \diagup \\ -CH_2 \quad CH_2-O-(A)_n-H, \end{array}$$

$C_1$- to $C_{22}$-alkyl and $C_7$–$C_{22}$-aralkyl;

wherein A and n are the same as defined in formulae V or VI;

wherein said zwitterionic polyamine has a weight average molecular weight of up to 9000 and optionally contains up to 100% of the nitrogen atoms in quaternized form.

2. The zwitterionic polyamine as claimed in claim 1, wherein the tertiary nitrogen atoms of said tertiary amine end groups of the polyamine backbone contain, as substituents, two groups of formula V or VI.

3. The zwitterionic polyamine as claimed in claim 1, wherein the nitrogen atoms of said tertiary amine end groups of the polyamine backbone are quaternized and contain, as substituents, a) two groups of formula V or VI and b) one $C_1$- to $C_{22}$-alkyl group or a hydroxy-alkyl group.

4. The zwitterionic polyamine as claimed in claim 1, wherein the nitrogen atoms of said tertiary amine end groups of the polyamine backbone are quaternized and contain, as substituents, a) two groups of formula V and b) a $C_1$- to $C_{22}$-alkyl group.

5. The zwitterionic polyamine as claimed in claim 1, wherein the nitrogen atoms of said tertiary amine end groups of the polyamine backbone are quaternized and contain, as substituents, a) two groups of formula V and b) a hydroxyethyl or hydroxypropyl group.

6. The zwitterionic polyamine as claimed in claim 1, wherein said spacer of said polyamine backbone is a cyclic $C_5$–$C_{15}$-alkylene group.

7. The zwitterionic polyamine as claimed in claim 1, wherein the polyamine backbone is derived from a polyamine selected from the group consisting of bis(hexamethylene)triamine, N,N'-bis(3-aminopropyl)piperazine, N,N'-bis(2-aminoethyl)piperazine and $$H_2N-CH_2-\text{[phenyl]}-CH_2-NH_2, \text{ and}$$

wherein at least one tertiary amine end group of the polyamine backbone contains two groups having formula V or VI.

8. A process for the production of a zwitterionic polyamine, comprising:

(A) reacting the following (i) with the following (ii):
   (i) a linear or branched hydrophobic polyamine having 2 to 10 primary or secondary amino nitrogen atoms and one spacer between two nitrogen atoms, wherein the spacer is selected from the group consisting of $C_8$- to $C_{15}$-alkylene, $C_5$- to $C_{15}$-cycloalkylene, $$-(CH_2)_3-N(H)-[B-N(H)]_o-(CH_2)_3-, \quad (I)$$

$$-(CH_2)_p-N(H)-[N(H)-B]_o-, \quad (II)$$

$$-(CH_2)_2-N(H)-[D-N(H)]_o-(CH_2)_2-, \quad (III)$$

$$-CH_2-\text{[phenyl]}-CH_2-,$$

$$-CH_2-CH_2-N\text{[piperazine]}N-CH_2-CH_2-, \text{ and}$$

$$-CH_2-CH_2-CH_2-N\text{[piperazine]}N-CH_2-CH_2-CH_2-, \text{ and}$$

wherein in formulae I, II and III
B is $C_2$–$C_{16}$-alkylene or $C_5$–$C_{15}$-cycloalkylene,
D is $C_4$–$C_{16}$-alkylene or $C_5$–$C_{15}$-cycloalkylene,
o is 1 or 2,
p is 3 to 8,
wherein in formula IV
R is $C_1$- to $C_{22}$-alkyl or $C_7$–$C_{22}$-aralkyl,
and n is an integer of from 3 to 6, and
   (ii) at least one $C_2$- to $C_4$-alkylene oxide or tetrahydrofuran; to obtain an alkoxylated polyamine;
wherein (i) and (ii) are reacted at such a ratio that for each NH group of said polyamine 1 to 50 units of the alkylene oxide are added, (B) reacting said alkoxylated polyamine with a compound selected from the group consisting of a halogen sulfonic acid, halogen phosphorous acid, vinyl sulfonic acid, propane sultone, halogen acetic acid, acrylic acid, methacrylic acid, vinyl phosphorous acid, an alkali metal of a halogen sulfonic acid, an alkali metal of a halogen phosphorous acid, an alkali metal of a vinyl sulfonic acid, an alkali metal of propane sultone, an alkali metal of a halogen acetic acid, an alkali metal of acrylic acid, an alkali metal of methacrylic acid, an alkali metal of a vinyl phosphorous acid, an ammonium salt of a halogen sulfonic acid, an ammonium salt of a halogen phosphorous acid, an ammonium salt of a vinyl sulfonic acid, an ammonium salt of propane sultone, an ammonium salt of a halogen acetic acid, an ammonium salt of acrylic acid, an ammonium salt of methacrylic acid, an ammonium salt of a vinyl phosphorous acid, in such a manner that at least one tertiary amine end group of said alkoxylated polyamine contains two groups having the formulae $$-(A)_n-X \quad (V)$$

or $$-CH_2-C(H)(O-(A)_n-X)(CH_2-O-(A)_n-X), \quad (VI)$$

wherein
A is an ethylene oxide unit, a propylene oxide unit, a unit of butylene oxides or a tetrahydrofuran unit,
n is a number of from 1 to 50,
X is $-SO_3M$, $-CH_2-CH_2-SO_3M$, $-CH_2-CH_2-CH_2-SO_3M$, $$-CH_2-CH(OH)-CH_2-SO_3M,$$

$-CH_2-COOM$, $-CH_2-CH_2-COOM$,
$-PO_3M_2$ or $-CH_2-CH_2-PO_3M_2$, with the proviso that in formula VI one X may also be hydrogen, and
M is hydrogen, alkali metal or ammonium,
or at least one tertiary amine end group of the alkoxylated polyamine contains a) one group of formulae V or VI and b) one group selected from the group consisting of $$-(A)_n-H,$$

and $$-CH_2-C(H)(O-(A)_n-H)(CH_2-O-(A)_n-H),$$

wherein A and n are the same as in formulae V or VI, to obtain a reaction product having tertiary nitrogen atoms, and, (C) optionally, quarternizing up to 100% of the tertiary nitrogen atoms of the reaction product; or (D) quaternizing said alkoxylated polyamine from step (A) and subsequently carrying out step (B).

9. The process is claimed in claim 8, wherein said polyamine (i) is selected from the group consisting of bis(hexamethylene)triamine, bis(aminopropyl)piperazine, N,N'-bis(aminopropyl)hexamethylenediamine and N,N,N',N'',N''-penta(2,3-dihydroxypropyl)-bis(hexamethylene) triamine, and wherein said alkylene oxide (ii) is selected from the group consisting of ethylene oxide, propylene oxide, butylene oxide and mixtures of the said alkylene oxides, and wherein a ratio between (i) and (ii) is such that for each NH group of the polyamine 15 to 40 units of the alkylene oxide are added, and wherein in step (B) said alkoxylated polyamine is reacted with chlorosulfonic acid in such ratio that at least one teritary end group of the polyamine contains two groups having the formula —(A)$_n$—X    (V)

wherein

A is an ethylene oxide unit, a propylene oxide unit or a butylene oxide unit, n is a number of from 15–40, and X is SO$_3$H, and wherein the reaction product having tertiary nitrogen atoms is quaternized with dimethyl sulfate, methyl chloride or benzyl chloride.

10. The process as claimed in claim 8, wherein said alkoxylated polyamine is quaternized up to 100% and subsequently reacted with chlorosulfonic acid.

11. A detergent, comprising:
the zwitterionic polyamine according to claim 1.

12. The detergent according to claim 11, further comprising:
a mid-chain branched surfactant.

13. The detergent according to claim 12, wherein said a mid-chain branched surfactant is a mid-chain branched alkyl sulfonate.

14. A dispersant, comprising:
the zwitterionic polyamine according to claim 1.

15. A dispersion, comprising:
the zwitterionic polyamine according to claim 1; and
a hydrophilic particle.

16. The dispersion according to claim 15, further comprising:
a water or a nonaqueous solvent.

17. The zwitterionic polyamine according to claim 1, which is selected from the group consisting of

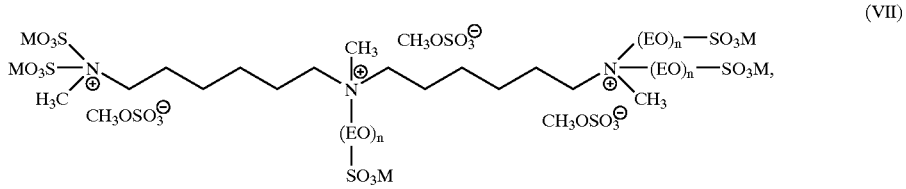

(VII)

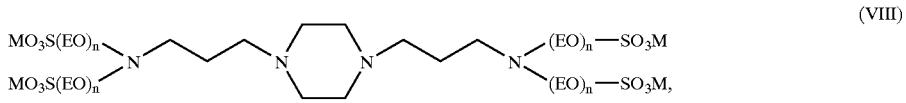

(VIII)

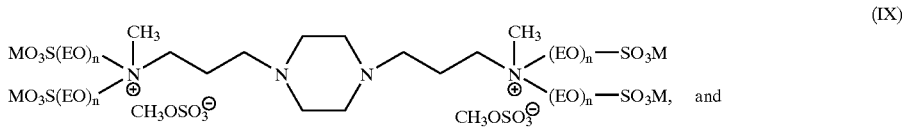

(IX)

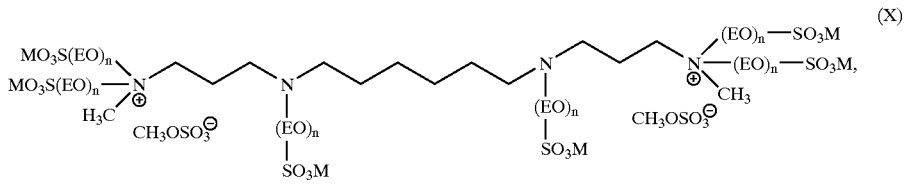

(X)

wherein
EO is —CH$_2$—CH$_2$—O—,
M is H, Na, K or ammonium and
n is a number of from 15–25.

18. The zwitterionic polyamine according to claim 1, which is net anionic.

* * * * *

UNITED STATES PATENT AND TRADEMARK OFFICE
CERTIFICATE OF CORRECTION

PATENT NO.    : 6,673,890 B1
DATED         : January 6, 2004
INVENTOR(S)   : Boeckh et al.

It is certified that error appears in the above-identified patent and that said Letters Patent is hereby corrected as shown below:

<u>Title page,</u>
Item [30], Foreign Application Priority Data, should be deleted
Item [60], Related U.S. Application Data, should read as follows:
-- [60] Provisional application No. 60/144,165, Jul. 16, 1999 --

Signed and Sealed this

Twenty-fourth Day of August, 2004

JON W. DUDAS
*Director of the United States Patent and Trademark Office*